US008688465B2

(12) United States Patent
Arora et al.

(10) Patent No.: US 8,688,465 B2
(45) Date of Patent: Apr. 1, 2014

(54) PHARMACEUTICAL REPRESENTATIVE EXPENSE REPORT MANAGEMENT SOFTWARE, SYSTEMS, AND METHODOLOGIES

(75) Inventors: Puneet Arora, Stamford, CT (US); Margaret K. Feltz, Wilton, CT (US); Sayee Natarajan, Norwalk, CT (US); Jake Stahl, Milford, CT (US); Bert Weinstein, Mountain Lake, NJ (US)

(73) Assignee: Purdue Pharma L.P., Stamford, CT (US)

( * ) Notice: Subject to any disclaimer, the term of this patent is extended or adjusted under 35 U.S.C. 154(b) by 1012 days.

(21) Appl. No.: 11/925,491

(22) Filed: Oct. 26, 2007

(65) Prior Publication Data

US 2008/0103822 A1 May 1, 2008

Related U.S. Application Data

(60) Provisional application No. 60/863,243, filed on Oct. 27, 2006, provisional application No. 60/867,906, filed on Nov. 30, 2006.

(51) Int. Cl.
*G06Q 50/00* (2012.01)
(52) U.S. Cl.
USPC ...................... 705/2; 705/30; 705/34; 705/40
(58) Field of Classification Search
USPC .................................. 705/2/3, 30, 32, 34, 40
See application file for complete search history.

(56) References Cited

U.S. PATENT DOCUMENTS

| 7,792,721 | B2* | 9/2010 | Licardi et al. ................. 705/35 |
| 7,945,489 | B2* | 5/2011 | Weiss et al. .................... 705/30 |
| 2001/0042032 | A1* | 11/2001 | Crawshaw et al. ............. 705/32 |
| 2005/0049903 | A1* | 3/2005 | Raja ................................. 705/7 |
| 2005/0222854 | A1* | 10/2005 | Dale et al. ....................... 705/1 |
| 2005/0222944 | A1* | 10/2005 | Dodson et al. ................. 705/39 |
| 2005/0256737 | A1* | 11/2005 | Liu .................................. 705/2 |
| 2006/0206506 | A1* | 9/2006 | Fitzpatrick ................... 707/100 |
| 2008/0046347 | A1* | 2/2008 | Smith et al. .................... 705/30 |

OTHER PUBLICATIONS

U.S. Appl. No. 11/925,552, filed May 1, 2008, Miretek Ciszkowski, et al.
U.S. Appl. No. 11/925,405, filed May 1, 2008, Cerbone et al.
U.S. Appl. No. 11/925,403, filed May 1, 2008, Ciszkowski et al.

* cited by examiner

*Primary Examiner* — Mark Holcomb
(74) *Attorney, Agent, or Firm* — Leason Ellis LLP

(57) ABSTRACT

Electronic assigning of expense data related to sales calls to customers such as health care professionals (HCPs) aids in complying with local, state, federal, or other regulatory reporting requirements and guidelines. The method includes providing expense report data and presenting a line-item entry of the report on a display. Through a user interface, one or more customers included within a database are selected. An expense amount associated with the line-item entry is automatically allocated into dollar amounts among the selected customer(s) and entries in the database are updated for each selected customer to now include the allocated dollar amounts.

22 Claims, 9 Drawing Sheets

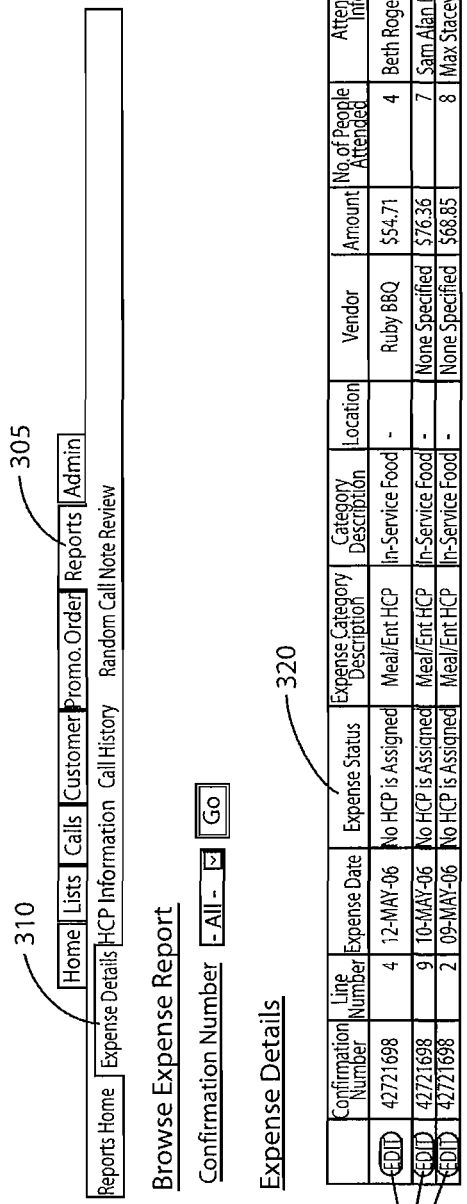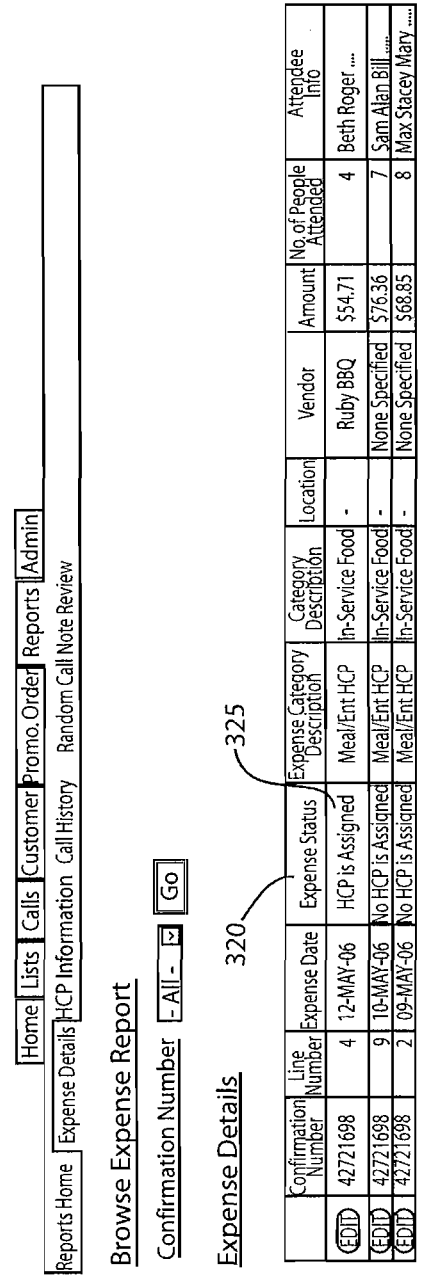
Fig. 3A
Fig. 3B

Fig. 7

| Day View | Week View | Calendar | Call | Meeting | Time Off | Itinerary/Schedule |

[Cancel] [Apply]

- Location | Michele | Reno,NV | ▽ | No Best Time for Friday : Click to Add
- Start Date Time 05/31/2006 🗓 8:00 AM ▽ ● End Time 8:30 PM ▽
- Call Type Presentation ▽
- Accompanied By -Select Rep/DM/RM- ▽   Tamper Prf. Script Pad # [         ]
- Sample Drop -Select- ▽
- Status Open ▽

YTD Amount Spent: $13.68 ← 710

Fig. 8A

Expense Review

Geography [XYZ01 ▽] Show: ○ All ● Over Due

| Geography ▲ | Week Start | Week End | HCP Flag |
|---|---|---|---|
| XYZ02 | 05/07/2006 | 05/13/2006 | N |
| XYZ03 | 05/07/2006 | 05/13/2006 | N |
| XYZ04 | 05/07/2006 | 05/13/2006 | N |
| XYZ05 | 05/07/2006 | 05/13/2006 | N |
| XYZ06 | 05/07/2006 | 05/13/2006 | N |

1 - 5

View in Excel

Fig. 8B

Expenses between 05/07/2006 and 05/13/2006 for Territory 01520202

| Confirmation Number | Line Number | Expense Data | Expense Status | Expense Category Description | Category Description | Amount | Vendor | Location | No. of People Attended | Attendee Info |
|---|---|---|---|---|---|---|---|---|---|---|
| 427214419 | 5 | 11-MY-06 | No HCP is assigned | Meal/Ent HCP | In-Service Food | $99.81 | NONE SPECIFIED | - | 10 | |
| 427214419 | 4 | 10-MY-06 | No HCP is assigned | Meal/Ent HCP | In-Service Food | $11.95 | NONE SPECIFIED | - | 10 | |
| 427214419 | 3 | 09-MY-06 | No HCP is assigned | Meal/Ent HCP | In-Service Food | $127.89 | NONE SPECIFIED | - | 15 | |
| 427214419 | 2 | 08-MY-06 | No HCP is assigned | Meal/Ent HCP | In-Service Food | $94.47 | NONE SPECIFIED | - | 12 | |

PHARMACEUTICAL REPRESENTATIVE EXPENSE REPORT MANAGEMENT SOFTWARE, SYSTEMS, AND METHODOLOGIES

This patent application claims the benefit of priority under 35 U.S.C. §119(e) of U.S. Application Ser. No. 60/867,906, filed Nov. 30, 2006, entitled "Pharmaceutical Representative Expense Report Management Software, Systems, And Methodologies," and of U.S. Application Ser. No. 60/863,243, filed Oct. 27, 2006, entitled "Territory Management System," which are hereby incorporated by reference in their respective entireties.

FIELD OF THE INVENTION

The present invention relates to the capture and reporting of expenses that relate to the activities of field representatives of manufacturers and service providers, and, more particularly, to software, systems and methodologies that assist in the capture and timely reporting of expenses with a health care professional.

BACKGROUND OF THE INVENTION

For several reasons, it is important to track and manage expenses related to promotion of business concerning sales calls to actual and prospective customers. One common reason for doing so is to have a defensible basis for seeking reimbursement from another entity, e.g., a manufacturer or service provider. Another reason relates to compliance with regulatory provisions or state or federal law. For instance, in the pharmaceutical sector, expenses with health care professionals such as doctors can be subject to constraints including annual limits on marketing costs and certain categories of spending can be subject to prohibitions.

The management and tracking of these expenses is a non-trivial task, especially in situations in which multiple representatives of the same company make calls (e.g., sales calls) to the same person or professional group within a given reporting period. One way in which a representative can inadvertently exceed permitted limits or constraints is to allocate expenses relating to spending on a professional who has already had expenses so-allocated by another representative in the same compliance period. This can occur even when field representatives have exclusively assigned professionals, because a given professional can be visited by multiple representatives for a variety of reasons, including to have different lines of product or service explained, or simply because that professional is part of a group that is visited by several representative (e.g., health management organizations or pharmacies having multiple professionals).

Thus, there is a need for improvements relating to one or more of the acts of tracking, managing, and reporting expenses incurred by company representatives, including expenses relating to visits with health care professionals. The present invention addresses these and other needs.

SUMMARY OF THE INVENTION

In accordance with one aspect of the invention, a computer-assisted method for electronically assigning an expense with one or more health care providers ("HCPs") has each HCP identified within a database of a machine associated with a user. Expense report data is provided which includes a line-item entry having an associated expense amount. The line-item entry is presented on a display, and, through a user interface, one HCP is selected. Another and further selections of HCPs can also be made. The expense amount of the line-item entry is automatically allocated into dollar amounts among each selected HCP. The database entries are updated for each obtained HCP to include the allocated dollar amounts.

In more specific methods in accordance with the foregoing aspect, the allocating step can allocate the expense amount into generally even dollar amounts among each selected HCP, the providing step can comprise downloading the expense report data, and the updating step can comprise the step of totaling the allocated dollar amount with any previously stored dollar amount for each selected HCP.

In still further more specific methods, additional steps can be performed so as to display information in the database relating to one or more HCPs in association with a totaled dollar amount, display allocated or totaled dollar amount spending on a given HCP on a year-to-date basis, or cause the machine to produce one or more alerts.

In yet another aspect of the invention, a computer-assisted method for electronically assigning an expense with one or more health care providers ("HCPs") has each HCP identified within a database associated with a user. Expense report data is provided which includes a line-item entry having an associated expense amount. The line-item entry is presented on a display, and, through a user interface, a first selection of a first HCP is obtained. An entirety of the expense amount of the line-item entry is automatically allocated to the first HCP obtained in response to the selection. A second selection of a second HCP is selectively obtained and the expense amount of the line-item entry is selectively allocated among the first and second HCPs in response to any such second user selection having been made.

These and other aspects, features, and advantages will be apparent from the following description of certain embodiments and the accompanying drawing figures.

DESCRIPTION OF THE DRAWING FIGURES

FIG. 3A is a sample expense report summary concerning spending activity by a representative;

FIG. 3B is the sample report of FIG. 3A after allocating expenses in one of the line-items to one or more health care professionals, which is a preferred application of the present invention;

FIG. 7 is one sample output form that presents allocated "year to date" amounts spent on a particular HCP, here in the context of call notes captured after a site visit;

FIG. 8A is a sample expense review form suitable for use by any of a representative, a district manager, and a supervisor in order to identify line-item entries in expense reports which have not been allocated among any HCPS; and FIG. 8B is a sample detail view that can be presented to a user interested in further information concerning the entries in the form of FIG. 8A.

DETAILED DESCRIPTION OF CERTAIN EMBODIMENTS

By way of overview and introduction, a territory management system provides representatives with a tool for conducting their activities in an efficient manner, and in particular includes functionality adapted to better ensure compliance with regulatory reporting requirements concerning, among other thing, expenses relating to visits with health care professionals ("HCPs").

The management system is preferably implemented as a software-based system, having components executing on a number of systems including a central computer and a multiplicity of remote machines, with each representative having a remote machine for his or her personal use and for forwarding adverse event information to a location associated with or accessible by the central computer. Without loss of generality, the present invention is described in relation to a particular representative using a single remote machine in the course of his or her activities covering an assigned territory. In the preferred embodiment described below, the representative is bespoke or contracted to a pharmaceutical manufacturer, and the representative "covers" a territory through visits to physicians and nurses (more generally, "prescribers") at which the representative is able to discuss and promote the use of the manufacturer's products.

A preferred software tool for a territory management system is described, in part, in the aforementioned U.S. Provisional Application Ser. No. 60/863,243. The Territory Management System software provides through a Web-browser interface a number of tools that assist the representative in planning, recording, and tracking activities with customers such as prescribers. In relevant part, the Territory Management System software can assist a representative with compliance issues concerning certain regulatory requirements or state or federal constraints concerning expenses relating to visits with health care professionals. The Territory Management System software includes additional features that can assist representatives in other ways, such as in reducing discrepancies in sample inventories as between stored and on-hand inventories, and scheduling site visits to HCPs. Various features of the Territory Management System software are described in certain non-provisional patent applications, which are also now co-pending and are referenced below to the extent they have pertinence to the discussion of the present invention.

The remote machine used by the representative includes a suitable complement of hardware and software including, by way of example, a processor, memory, an accessible database, communications equipment, and input/output devices.

Figure 1:
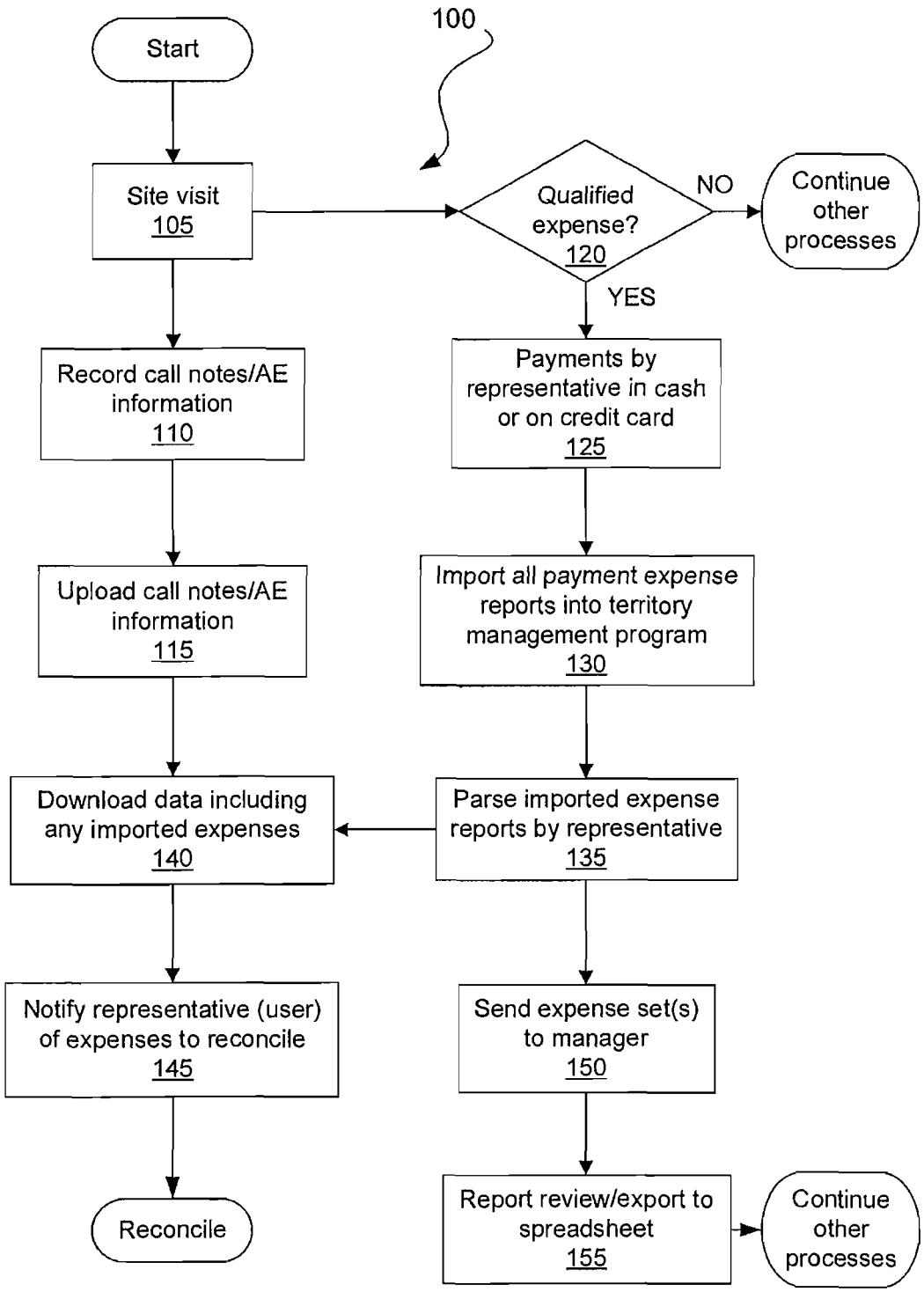
FIG. 1 is a flow diagram illustrating certain steps in accordance with one embodiment of the invention relating to the capture of certain expense information into a territory management software application.

Referring now to FIG. 1, a flow diagram illustrates functionality suitable for capturing certain expense information that a representative may incur in the course of covering his or her territory. Because the representative makes a point of visiting prescribers, he or she may, in the course of such sales calls, incur expenses. Likewise, in other fields, the representative may incur expenses which need to be captured and matched against the customers that were visited. The term "expense" or "qualified expense" as used in relation to an expenditure by a representative on a customer are those that are subject to regulatory or government limits, and sometimes also to reporting requirements, and can be, by way of examples, meals, coffee, advertising and/or promotion-related expenses and marketing-related expenses. As used herein, the expense in an expense report excludes amounts spent on or reasonably assignable to the representative accompanying any prescriber(s) at the time the expenses are incurred.

The process 100 illustrated in FIG. 1 concerns activities relating to an appointment of the representative, which can be a scheduled appointment or a "drop-in" visit. In the area of pharmaceutical representation, it is common for a representative to drop-in on a prescriber within the representative's assigned territory with the hope that the prescriber will be able to speak with the representative for a few minutes. The nature of such visits can vary from informal to formal, but one objective of the representative is to promote a prescriber's familiarity and understanding of pharmaceuticals that the representative wishes the prescriber to prescribe to patients. In other fields, the representative similarly has an objective of promoting purchase and use of his or her represented products and services through educational and promotional efforts.

Thus, at block 105, the representative makes a site visit to a particular prescriber's office. The representative typically makes a number of visits during the course of a day, whether scheduled or drop-in, and these visits can be coordinated through a calendar function provided by the same programmed system that handles the representative's reporting of any expense information. The scheduling and calendar functions form no part of the present invention, but are described in the following applications: U.S. Application Ser. No. 60/868,015, filed on Nov. 30, 2006, entitled "Cycle Planning Tool for Territory Management," U.S. Application Ser. No. 60/868,027, filed on Nov. 30, 2006, entitled "Itinerary Search Tool for Territory Management," and U.S. Application Ser. No. 60/867,902, filed on Nov. 30, 2006, entitled "Methods for Sales Call Data Management and Processing," which are each hereby incorporated by reference in their respective entireties.

It may be that the prescriber is not available for a conference with the representative, in which case the representative proceeds to a next appointment by traveling to another site within his or her territory, preferably with guidance from a calendared set of appointments that fill the day. If, however, a conference is held with a prescriber at a particular site visit, then the representative is supposed to capture a summary of who was met, what products (services) were discussed, whether samples were provided (and details concerning same), whether any adverse event information was discussed, propose a next meeting and follow-up discussion points, and document any expenses attributable to any prescribers that were visited.

Representatives generally seek to satisfy any concerns expressed by the customers in their territory, and so follow-up points can be captured in the territory management software so that the representative can better address those concerns with their customers. Representatives also have obligations to the company they represent to document any expenses attributable to visits to their customers and any adverse events that may have been reported for investigation or follow-up. Functionality, systems and methodologies suited to adverse-event data capture, management and reporting are described in U.S. Application Ser. No. 60/867,923, filed on Nov. 30, 2006, entitled "Adverse Event Data Capture Software, Systems, And Methodologies" ("AE Capture"), which is hereby incorporated by reference in its entirety, and is not described further in this application.

Use of the territory management system commences then at block 110 at which the representative initiates the entry of visitation notes, known as making a "call completion" because he or she has completed a sales call to the prescriber/customer and has meeting notes to record. The user can initiate this data entry process in a variety of ways. For example, a calendar feature of the management system can present an icon such as a telephone icon for selection which causes a call-notes entry form to be displayed. Alternatively, the calendar feature of the management system can include entries showing the time, location, or both, of the visits for that day which the representative can select to bring up the call-notes entry form. Yet another alternative is that the representative can call up a prescriber summary page which can include a link (or an icon as mentioned above) to enter call notes that are to be associated with that prescriber visit.

At block 110, the user inputs call notes and any adverse information using a suitable data entry form, such as the call-notes entry form described in the aforementioned AE Capture disclosure, which is recorded into the local database on the user's machine. The completed call notes and any adverse-event information are uploaded to the central computer over a suitable communication link, at block 115. During that same communication or in a separate communication session, the central computer can download to the user's machine information that is designated for receipt by the representative, including, in relevant part, any expense information that has been imported or otherwise provided to the software, as indicated at block 140. The data exchange is over a communication link between the central computer and the remote machine of the representative. In the event that the representative's machine includes wireless network capabilities (e.g., a broadband card that can connect the machine through a "hot spot"), the upload at block 115 (and optionally the download at block 140) can occur whenever the system detects that it has secure network connectivity, and this process can be performed as a background thread while the user performs other tasks on the machine running the territory management software. The data exchange can be conducted in accordance with U.S. Application Ser. No. 60/867,943, filed on Nov. 30, 2006, entitled "Data Cache Techniques In Support Of Synchronization of Databases In A Distributed Environment," which is hereby incorporated by reference in its entirety.

Referring again to block 105, in some cases the site visit with a particular prescriber can include expenses relating to business promotion, marketing, or meals with the prescriber or the prescriber's staff, or a combination of these expenses. In the event that there were any qualified expenses, conceptually expressed at block 120 as a decision, then in accordance with a salient aspect of the present invention, those expenses can be captured and tracked using functionality of the territory management software described next. In the event that there were no qualified expenses associated with the site visit, other processes can be continued, including the normal activities of the representative in conducting his job duties, with or without assistance from the territory management software.

In the event that there were any qualified expenses, those expenses are typically paid in cash or charged to an account through the use of a credit card, such as a card provided by a creditor such as American Express®, Visa®, MasterCard®, or Discover®, as indicated at block 125. The term "credit card" is meant to broadly include a variety of accounting mechanisms that enable a representative to pay for any qualified expenses with a customer. By way of example, expenses that might be paid in cash or charged to a credit card include coffee, lunch, dinner that may be incurred with one or more prescribers or their staff. In order to comply with various regulations and guidelines, expenses of that nature are to be recorded and tallied so as to stay within any limitations or constraints or otherwise be in a form that permits reporting to interested parties, such as the company for whom the representative works, a state or federal agency, a watchdog group, and the like.

At block 130, expense reports are preferably imported into the territory management software system. By way of example, the information in the expense reports can be manually input in connection with the representative's preparation of an expense report. An expense management software package, such as Expenselink® available from Gelco Information Network, Inc. of Eden Prairie, Minn., can be used for expense report entry. The Gelco software provides a Web-based software package in support of general management of expense reporting, including functionality suitable for the tasks of taking-in expense reports from each representative and coordinating individual line-item entries of the expense report (in the event that there is more than one expense in any given expense report) with cash and credit card expenditure information. However, additional steps are required to allocate and apportion expenses related to visits with health care professionals, as described below in connection with FIG. 2. Optionally, expense management functionality can be integrated into the territory management system in which case the expense reports need not be imported into the territory management system, but rather can have their contents available to the process at block 135, described next.

At block 135, the expense reports are parsed or otherwise arranged by line-item entry so as to identify those expenses associated with each particular representative. The expense information, so organized or arranged, can be included in the data download at block 140 to the remote machine of the representative. Typically, the information that can be downloaded to the representative's machine includes most or all of the information captured in the expense report software being used, including the date, amount, currency, location, vendor (e.g., "Ruby's BBQ"), expense report confirmation number, a line number within the report, an expense category description, a general category description, an indication of the number of people associated with the expense, and perhaps other attendee information.

At block 140, a download is made to the remote machine after the establishing a communication link between the remote machine and the central computer. In relevant part, the download updates the database on the remote machine of the representative with the expense information that has been imported into the territory management system from the expense report processing software (e.g., Gelco). The download can also include information sufficient to revise the scope of the representative's territory, to provide prescription-writing information on the prescribers in the representative's territory, to add new prescribers, and to change the user's role (e.g., from representative to district manager). Such downloads are preferably conducted in accordance with U.S. Application Ser. No. 60/867,945, filed on Nov. 30, 2006, entitled "Software, Systems and Methodologies For Realignment of Remote Databases By A Central Database In Support of Field Representative Territory Assignments," which is hereby incorporated by reference in its entirety.

At a time during or after the download of data, optionally, if there is expense information to be reconciled with particular health care professionals, a notification can be provided, as indicated at block 145, to the representative of this development. Notifications can be provided at intervals, as may be deemed appropriate, to encourage reconciliation within acceptable or mandated time limits. A table or other data resource can be available to the notification routine to determine how much time has transpired since the date of the expense that is to be reconciled and the present date for use in determining how many and how often notifications are to be provided. The notifications themselves can take on one or more of a variety of forms, including without limitation dialog boxes, pop-up alerts, emails, and sounds. The notifications are desirable because conventional expense management software does not adequately address the allocation and apportionment of expenses to HCPs so as to satisfy any constraints or prohibitions. The process continues, with or without such notifications, with the reconciliation of the expenses, described below.

In addition to downloading expense information to the representative's machine, the expense information can be forwarded to a manager's machine, as indicated at block 150. For example, the information can be forwarded (e.g., downloaded or communicated in other ways) to a district manager whose responsibility is to supervise and review the work of one or more representatives in one or more territories. In this regard, the manager can view expense details in one or more reports and take steps in furtherance of the analysis of such data such as by exporting the information to a spreadsheet, as indicated at block 155, before continuing with whatever other tasks the manager may wish to do (as indicated in the termination block).

Figure 2:
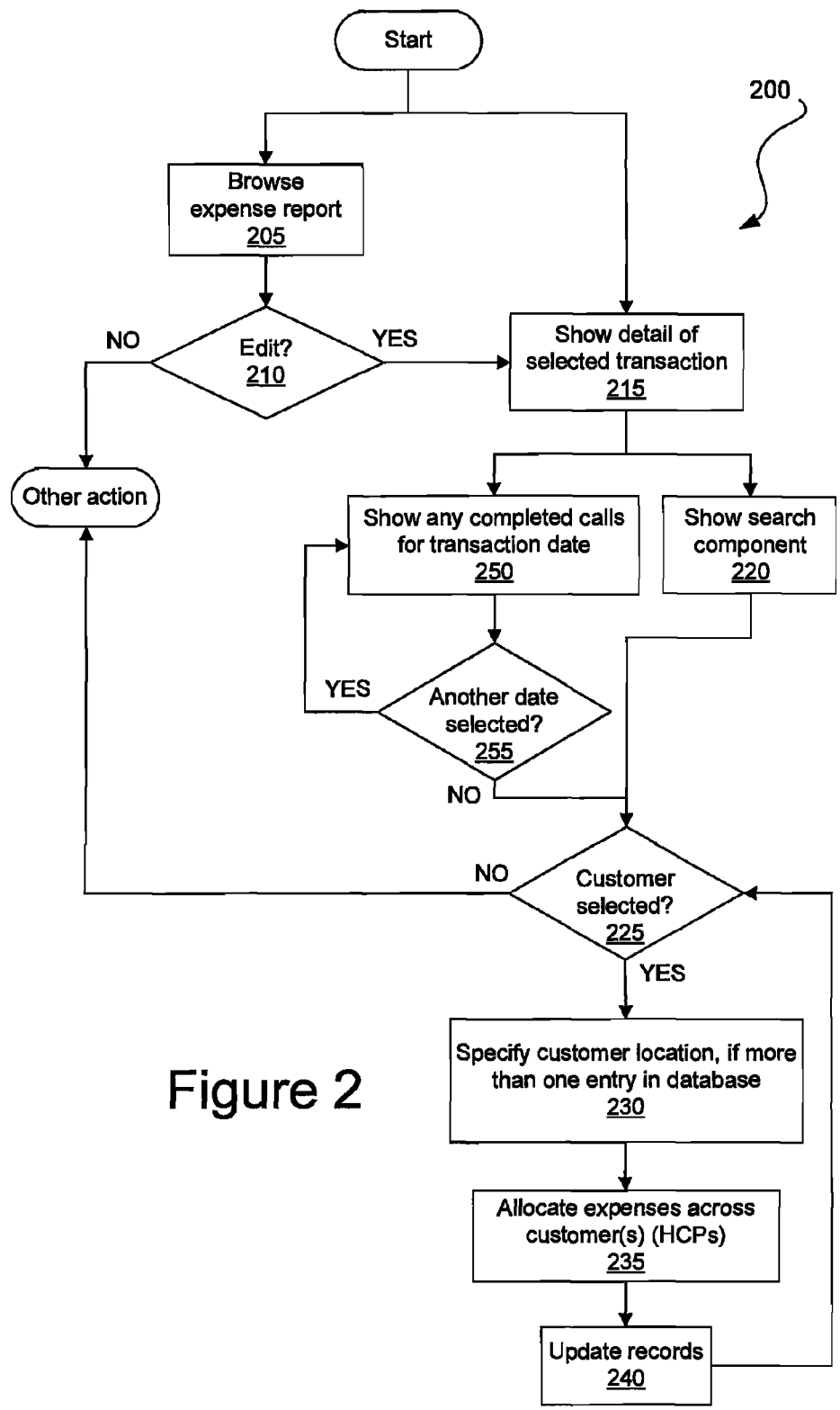
FIG. 2 is a flow diagram illustrating certain steps in accordance with an embodiment of the invention relating to the allocation of expense information among customers which has been captured by a process such as illustrated in FIG. 1.

Referring now to FIG. 2, a flow diagram illustrates a series of steps 200 taken in furtherance of reconciling expenses from an expense report so as to allocate the expense information among customers such as HCPs, in accordance with an embodiment of the present invention. Either in response to a notification that there are expenses to be reconciled, or navigation through the functions provided by the territory management software, the user is able to browse expense report information, as indicated at block 205, through an interface provided by the software. FIG. 3A shows a sample expense report summary 300 concerning spending activity by a representative, which report can be accessed by interacting with "tabs" graphically provided within the interface. The "tabs" are software objects that operate as a metaphor for a conventional folder. By click-selecting a tab, a new window or region is made active or is brought to the foreground. In this case, the "Reports" tab 305 brings to the foreground of a display of the representative's machine a set of options, each selectable by their own tab, including an "Expense Details" 310 option. Each expense report submitted by the representative can be included in this view, and, more particularly, any expense report that has line-item expenses to be assigned to particular HCPs is included in this view. Thus, in FIG. 3A, three line items from expense report "427216198" are shown (lines 4, 9, and 2), and none of those line-items has its expense assigned to an HCP ("Expense Status: No HCP is assigned"), as of yet. Each line-item entry in can be edited by selecting the "Edit" control 315, so as to allocate expenses to and optionally apportion expenses across one or more HCPs. FIG. 3B, for example, shows the report of FIG. 3A with an updated expense status field 320 resulting from steps taken to assign the $54.71 expense to HCPs, as shown in cell 325, and as described next in connection with FIGS. 2 and 4-6.

At block 210, a test is made by the territory management software to determine whether the user has selected the edit control 315. If the user has not selected that control, the process continues with some other action, as indicated conceptually by the terminator "other action." On the other hand, if the user has selected the edit control 315, the process flow proceeds to block 215 to show an expense report detail 400 concerning the selected transaction, as shown in FIG. 4A.

Figure 4A:
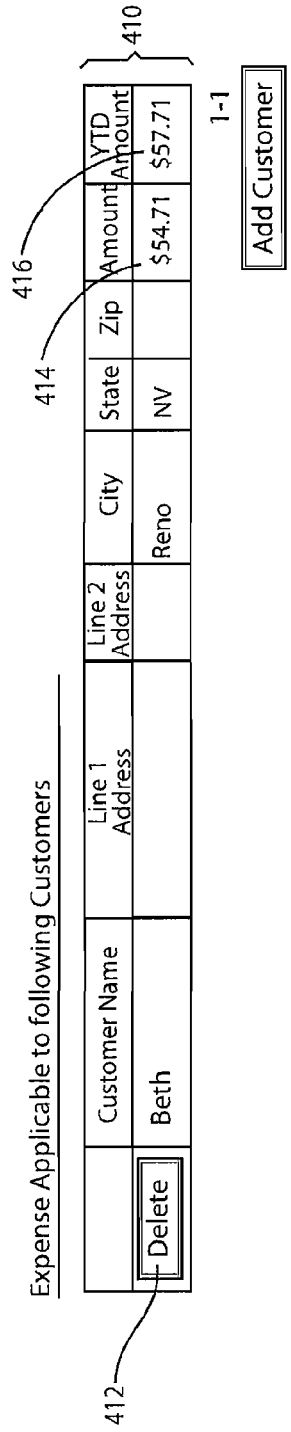
FIG. 4A is a sample form for allocating expenses among particular health care professionals.
Figure 4B:
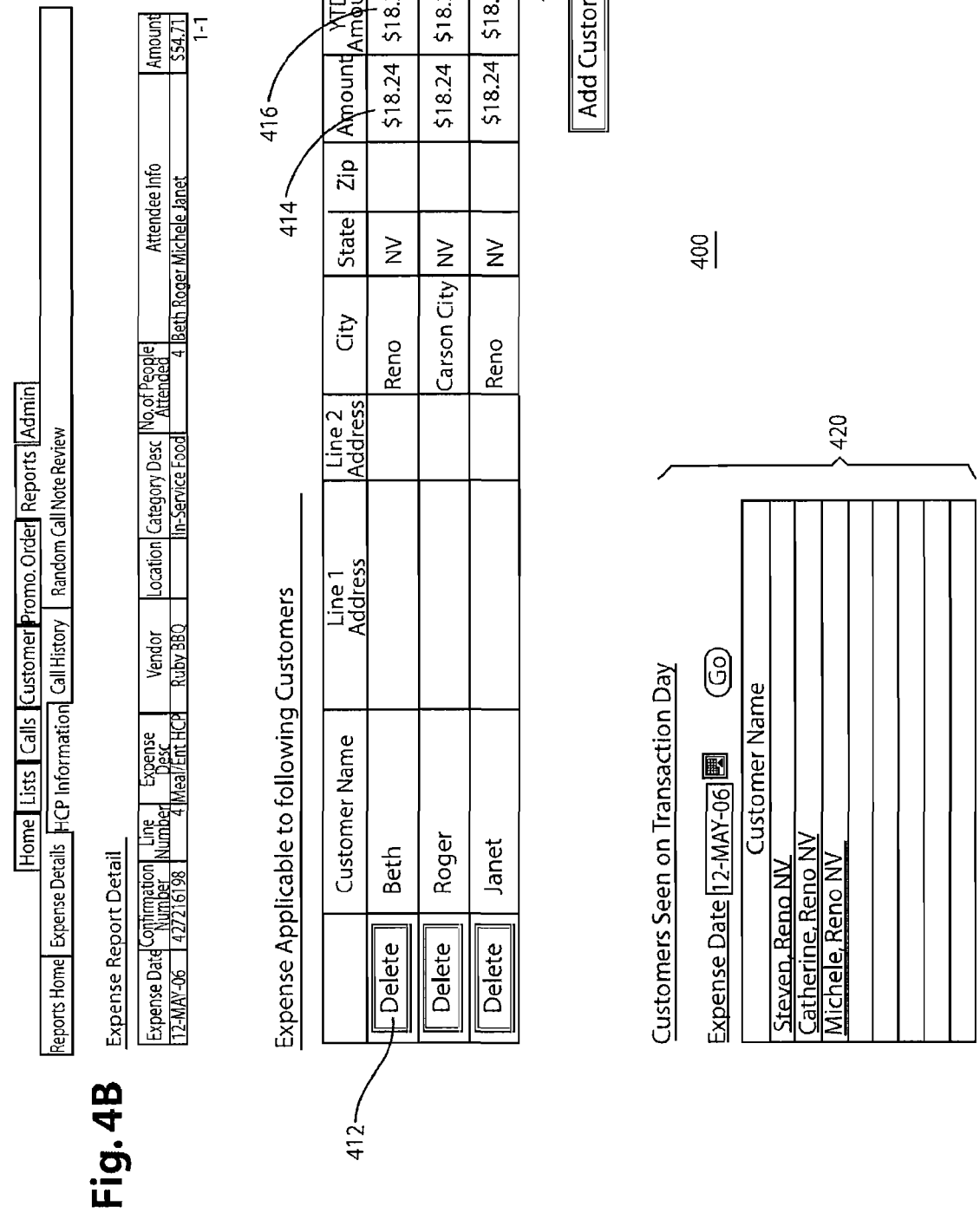
FIG. 4B is the sample form of FIG. 4A, now showing allocations relating to a line-item expense among multiple health care professionals.
Figure 4C:
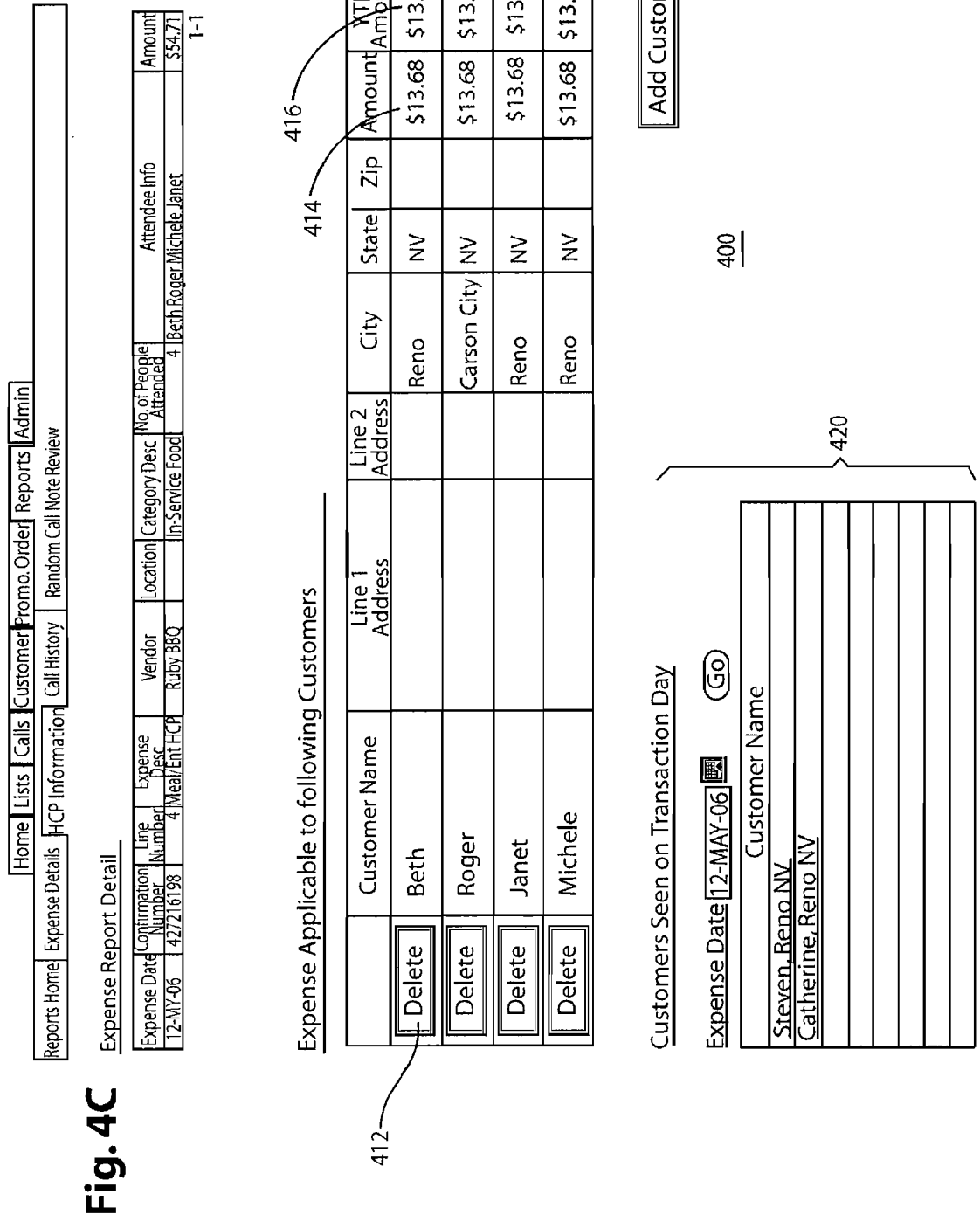
FIG. 4C is the sample form of FIG. 4B, now showing an additional allocation relating to the line-item expense.

FIGS. 4A, 4B and 4C illustrate a sample form for allocating expenses among particular health care professionals at different stages in the expense-allocation process. Referring first to FIG. 4A, the expense report detail form 400 can include some or all of the fields illustrated in the expense report summary 300, and is configured to permit the representative to assign health-care provider information to a given expense. Each cell contains data that is stored in the local database of the representative's machine. The expense report detail form 400 can include several regions for data entry including a customer-assignment region 410 and a customers-seen-on-transaction-day region 420. Optionally, a customer search region 510, as shown in FIG. 5, can be displayed (or closed/hidden using user-interface control 520) for use in assigning HCP expenses.

Figure 5:
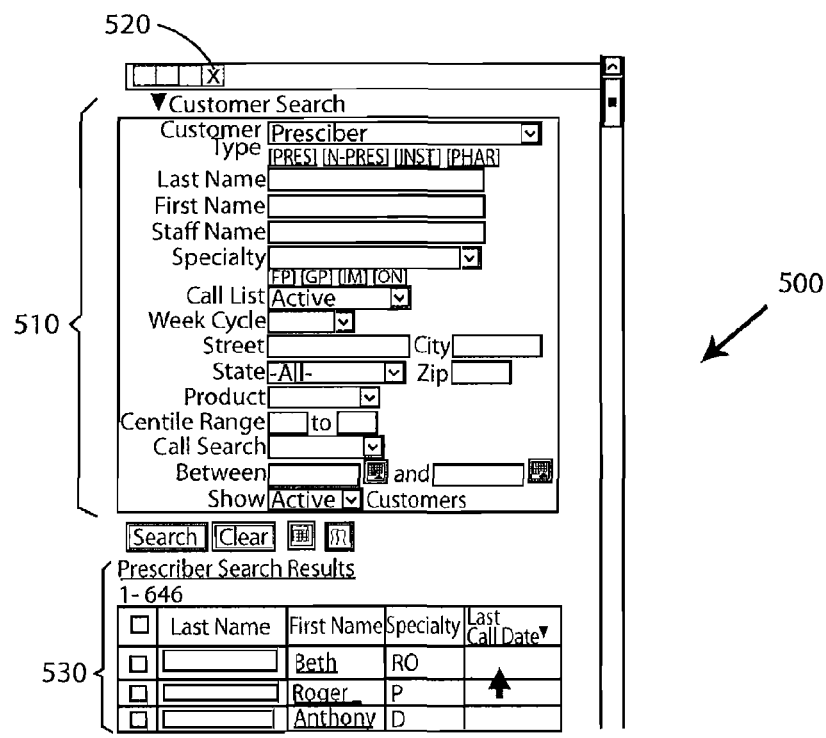
FIG. 5 is a sample search form which is suitable for identifying customers such as health care professionals from among those assigned to a representative's territory, with the search results being available for selection and use by the representative in completing forms such as the sample of FIG. 4A.

Referring now to FIGS. 2, 4A and 5, the expense report detail form 400 shows details of confirmation "427216198," line number 4, of the expense report, as indicated at block 215. This transaction was in the amount of $54.71, and region 410 has been updated, so far, to make that expense applicable to one HCP, namely, "Beth." The assignment of the expense to the HCP, in this instance, is a result of a customer search using the search window 500, which is shown on the display of the representative's machine, as indicated at block 220, and a selection of that first HCP. The search region 510 in FIG. 5 has been configured to retrieve customers of type "prescriber," who are on an "active" call list, regardless of which state they are in. For this particular representative, having a territory assigned to him and a local database which provides information on customers within his or her territory, that search results in 646 prescribers, as indicated in the prescriber search results region 530. The prescribers located by this search are listed and can be viewed by conventional scrolling operations, as understood by those of skill in the programming arts.

Figure 6:
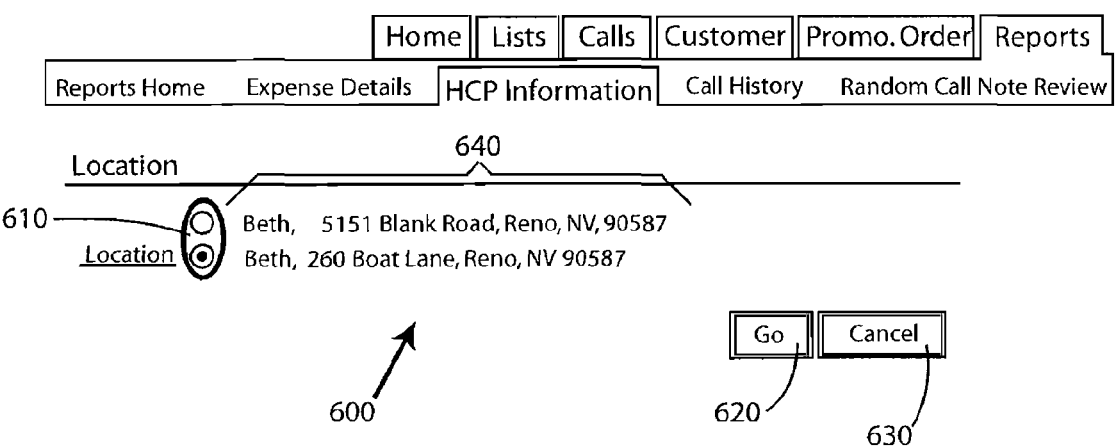
FIG. 6 is a sample input mechanism for more particularly identifying an HCP's location when several are included in the database.

The first entry displayed in the region 530 is the prescriber "Beth." That prescriber is obtained and added to the customer-assignment region 410 by interacting with the user interface. One manner of such interaction comprises pointing to the row in the search results region 530 (as shown) to highlight that prescriber and then and click-selecting that entry, as tested at block 225. In some circumstances, the customer may have more than one location within the representative's territory, in which case the representative can be prompted to specify which location was visited, as indicated at block 230. For example, this can occur when the customer is a pharmacy with multiple locations, a doctor with several offices, or a customer of another type having more than one facility. The selection of which location applies can be guided using information in the local database which can be presented to the user along with controls for selecting the appropriate office. FIG. 6 illustrates one such display 600, in which several locations for the same prescriber ("Beth") and one location is selectable from the group by using a radio button 610 and a submit button 620 (and a clear button 630 if the user wishes to clear the radio-button selection), with the location information 640 being populated based on information in the local prescriber database. The local subscriber database is preferably the same database that is searched to locate subscribers in the representative's territory, and is "local" in the sense that it is available without any connection or connectivity to another machine or network. Optionally, a primary location, if so-identified within the local database, can be a default selection for the radio buttons 610.

As shown in FIG. 4A, the expense has been allocated to prescriber "Beth," as indicated in field 414. In other words, the $54.71 expense in line-item 4 of confirmation "427216198," so far, has been allocated solely to "Beth." The year-to-date expense associated with that prescriber for all representatives that may contact that customer is indicated in field 416, and, in this case, the amount differs by $3.00. In this regard, it should be noted that persons other than a company sales representative can have expenses associated with a particular HCP, and the year-to-date totals preferably reflect that fact. In the event of an error in assigning a particular prescriber to an expense, the assignment can be undone using the delete control 412. This particular expense report line-item indicates that there were four attendees (may include other attendee information in a suitable field that documents the expense related to confirmation "427216198"). The prescriber search results in region 530 can be reviewed in order to locate the three other customers to whom the expense is to be allocated, as described above, or the allocation of expenses can be performed under guidance of the information in region 420, as described next.

Referring now to FIGS. 2, 4A and 4B, in the event that the expense is applicable to more than one customer, a second HCP or any number of additional customers can be selected and a given expense item can be allocated among multiple customers. In the previous example, the expense of line-item 4 ("Ruby BBQ", $54.71 of May 12, 2006) can be allocated among all four of the attendees indicated in the underlying expense report (confirmation "427216198") through use of region 420, if such region is provided. The region 420 preferably shows those customers (e.g., prescribers) for whom the representative completed a call note or otherwise has indicated in the database a visit on the same date as the expense in the expense detail report, as indicated at block 250. This selection of prescribers can be obtained by a database query performed on the local database to locate entries in the database that have data matching the expense date in the line-item entry. Thus, in FIGS. 4A and 4B, the region 420 shows customers at which site visits were made on May 12, 2006. If more multiple customers are listed, a scroll control bar can be provided. If for any reason a different date is to be viewed (e.g., a formal call visit was made on May 12, 2006 but the expense was incurred or processed on May 13, 2006), an expense date can be manually input into text box 422 and submitted using a submit button 424, or a calendar icon 426 can be provided which launches a date-selectable calendar pop-up, as is now conventional in the programming arts. Block 255 tests whether another date has been selected, and the contents of the region 420 can be updated to show completed calls on any newly-selected date. Regardless of whether the date is changed, the region 420 is populated with information arranged to permit review and selection of customers that were visited or otherwise associated with a particular date. Any entry in the region 420 can be selected through conventional interaction with the interface, such as a click-selection so as to cause the expense to be assigned to a prescriber and optionally apportioned in region 410 across any additional customers. At block 255, a test is made to determine whether any customer has been selected.

If no customer has been selected, then the process loops to handle any other action. On the other hand, if a customer has been selected, then the process flow proceeds through blocks 230-240, as described next by way of example.

Referring now to FIG. 4B, that figure shows prescribers Roger and Janet as having been selected from the region 420 of FIG. 4A. This causes those prescribers to be included in the region 410 of FIG. 4B as having the $54.71 expense at Ruby BBQ allocated to them. If any of the selected customers has more than one location, the process at block 230 is performed. In the event that there is more than one customer assigned as having the expense as applicable to him or her, then the expenses are allocated across all such customers, as indicated at block 235, preferably. The allocation can be performed generally evenly across such customers such that within an acceptable rounding error (pennies, dollars), the amounts are the same. Preferably, the allocation of a single expense entry occurs automatically in response to any selection and, hence, any addition of a customer to the region 410, and also automatically in response to any deletion of a customer from the region 410. In addition, it is preferred that any year-to-date spending total allocated to any given customer be automatically calculated and populated into the local database for upload to the central computer (step 115) when the opportunity arises. The allocations to HCPs are committed by updating the local database.

In the example of FIG. 4B, the $54.71 expense is shown as having been allocated among three attendees (Beth, Roger and Janet), and each attendee has been allocated one-third of the original expense amount, namely, $18.24 of the total expense. The expense reported in line-item 4 remains unchanged, that is, it remains $54.71. Also, records including the local database are updated, as indicated at block 240. In part, this will include an update to the expense status field 320 of the transaction from "No-HCP Assigned" to "HCP Assigned" (compare FIGS. 3A and 3B).

Referring now to FIG. 4C, a fourth prescriber has had the line-item expense of confirmation "427216198" assigned to her. Specifically, "Michelle" has been added to the list of prescribers for whom this expense is to be assigned, and as a result of processing at least blocks 215, 225, 235, and 240, the expense is now allocated among four prescribers, with each prescriber being allocated one-fourth of the original expense amount, namely, $13.68 of the total expense. The interaction of the user and the machine, and the processing that take place during this step are no different than what transpired in connection with the allocation shown in FIG. 4B. However, FIGS. 4A, 4B, and 4C collectively illustrate an optional, but preferable feature, in that the region 420 can be dynamically updated so as to only display those customers to whom an expense was not already allocated. Thus, in FIG. 4B, the customer region 420 excludes Beth—even if a call was paid that same date to Beth, because that prescriber has already been assigned to the expense. Likewise, in FIG. 4B, prescribers "Roger" and "Janet" have been removed from the region 420, despite their being a completed-call associated with that transaction date (note, they were included in region 420, as shown in FIG. 4A, until they were assigned to the expense). Finally, in FIG. 4C, the selections have been processed and the display has been refreshed so that region 420 now omits prescriber Michelle because she has been assigned to the expense and placed in region 410. Stated another way, a prescriber assigned into the region 410 is preferably not included in the selections available in region 420 so that the region 420 can guide users in a manner to reduce duplicate selections of the same prescriber.

The allocation can be done in other ways than as suggested by the sample input form 400. For example, information input into an expense report such as the number and name of the attendees can result in a proposed allocation which the representative can confirm, after ensuring the correct assignments have been proposed and after a location for the allocated prescriber is entered or confirmed.

With reference now to FIG. 7, an output interface display component 700 has the call notes entry form provided with a field 710 which informs the representative of the year-to-date ("YTD") spending on that HCP. This can assist the representative in staying in compliance with state limits on expenditures with individual health care professionals, and is particularly beneficial when more than one representative from the same manufacturer has paid a call to that prescriber, directly or indirectly, by visiting the same hospital or medical group and having apportioned expenses to that same prescriber. FIG. 7 illustrates the YTD spending on a given prescriber in the context of call notes captured after a site visit, as indicated by the "call" tab 720, however, YTD spending can be provided in a variety of interface display components, including without limitation, as part of another form or data presentation in association with a view of any appointments or any calendar entries that concern that particular prescriber, or as part of a pop-up when the user hovers over or clicks on a field associated with that prescriber. DHTML, XML, AJAX, and similar command constructs can be used to pull YTD information from the local database and make it available for presentation to the user in response to an event such as a mouse-over or a mouse-click.

With reference again to FIG. 1 and also to FIGS. 8A and 8B, expenses captured and tracked by the territory management system can also include processing or review by managers assigned to particular representatives. A district manager, whose responsibility is to supervise and review the work of one or more representatives in one or more territories, can request or receive one or more expense report entries, as indicated at block 150, as well as other information such as the call-notes associated with expense report entries. It may be that the call notes have adverse event information associated with them, and a protocol can be exercised in response to the receipt of that information, as more fully described in the aforementioned co-pending AE Capture disclosure. Of relevance to this application, however, the manager can be provided with an expense review form 800, such as shown in FIG. 8A, which is suitable for use by a representative (by selecting an appropriate tab from the reports menu 305), a district manager, or another supervisor. The expense review form 800 arranges by territory ("geography") the expense reports submitted during particular weeks, as well as a status (submitted or not submitted, indicated here with a YIN data entry in the HCP status field 810). The user of this report can view all reports, or just those that are overdue. In FIG. 8B, overdue reports are shown for a particular territory (e.g., a particular representative) and a particular week. In this case, there are four overdue entries, all associated with line-items of the same expense report submission. The manager, upon review of this report, can take steps to prompt the representative so as to change the expense status from No-HCP Assigned to HCP Assigned, as described above.

Preferably, protocols can be established with enforcement through notifications to interested persons, such as the notifications to the field representatives described in connection with block 145, to ensure the timely assignment of expenses to HCPs within a prescribed window. Such notifications can issue, for example, if a prescribed period of time has transpired from the expense date of a given expense report line-item entry. The notifications comprise alerts which can take on a variety of forms including, without limitation, pop-up and other dialog boxes, instant messages, emails, calendar notifications, sounds, or a combination of the foregoing. Optionally, the expense records can be restricted after, say, two months, to not permit changes to any prior or absent entries.

Similarly, notifications can be provided and reports can be generated which serve to alert the representative, his or her district manager, if any, and other interested persons of spending amounts in a territory. These notifications and reports can be informed by state and other regulations within the territory to better ensure that spending limits are constrained to acceptable levels. In one implementation of this feature, the year-to-date spending can be shown in relation to the maximum permissible spending (e.g., if there is a $50.00 per year limit, a spending of $37.18 can be displayed as "$37.18/$50.00" or as "$37.18, 74% of limit"). In the same or another implementation, notifications can be generated and displayed on the representative's machine or communicated to another location when a spending limit threshold is reached for a particular HCP or other customer (e.g., send a notification once 80% of a limit is reached). This can be particularly helpful for representatives that, mid-year, acquire HCPs that were previously in other representative's territories, or who have HCPs that have had qualified expenses registered by other persons at the company, or who have HCPs in more than one state and have different spending limit constraints applicable to different groups of HCPs in their territory. Optionally, the user, whether a representative or a manager, can inspect the data and generate other analytics to discern spending patterns of representatives on prescribers, prescriber habits in view of spending by representatives, overall spending in a state or other region, and the like.

Optionally, the user interface can include a selectable link that can provide the representative with a summary of relevant guidelines throughout the country or his or her territory, including any local, state, or federal restrictions on expenses incurred in connection with dealing with HCPs, any company guidelines or requirements concerning expenses with HCPs, and any other information of pertinence to the assignment of expenses to HCPs due to the representative's conduct of his or her duties.

In the foregoing description, certain flow diagrams have been shown and processes described in relation to those flow diagrams which provide a reference for discussion purposes. In an actual implementation of the methods of the present invention, the steps can comprise event-driven routines that can run in parallel and can be launched and executed other than as shown by the simple depiction in the flow diagrams. For example, a number of customer selections can be made or obtained at block 225 through the user interface before any allocation is made at block 235. In short, the particular order of the steps in the flow diagrams is illustrative of the invention, but not limiting of the various permutations that can be achieved in a given embodiment. Accordingly, it is the performance of the steps recited in the claims appended below which is pertinent, and not the order of operation of the steps themselves.

We claim:

1. A computer-assisted method for electronically assigning an expense of a particular representative among a plurality of representatives with one or more health care providers ("HCPs"), each HCP being identified within a database, comprising the steps of:

providing expense report data to a memory of a machine, the expense report data including a line-item entry having an associated expense amount and an expense date;

presenting the line-item entry on a display of the machine;

displaying a selection of HCPs that satisfy the criterion of having a call-note entry in the database which corresponds to a visit by the particular representative with the HCP on the expense date;

selecting through interaction with a user interface on the machine one HCP from among the selection of HCPs that satisfy the criterion of having the call-note entry in the database which corresponds to the visit with the HCP on the expense date;

selectively selecting through further interaction with the user interface another HCP from among the selection of HCPs that satisfy the criterion of having the call-note entry in the database which corresponds to the visit with the HCP on the expense date;

automatically allocating the expense amount of the line-item entry into dollar amounts among each selected HCP using a processor of the machine in response to the selection of the another HCP and in response to the deletion of one or more selected HCPs;

updating database entries for each selected HCP to include the allocated dollar amounts in said entries and to include a year-to date-spending total allocated to each selected HCP, including in the spending total of expenses allocated to each selected HCP by any of the plurality of representatives, using the processor of the machine;

displaying on the display of the machine the year-to-date spending total associated with at least each of the HCPs to which the expense amount of the line-item entry has been allocated; and providing at the machine a status of a particular line-item entry which indicates whether an HCP has been assigned to the expense associated with the particular line item entry.

2. The method of claim 1, wherein the allocating step allocates the expense amount into even dollar amounts among selected HCPs to an acceptable rounding error of the order of pennies or dollars.

3. The method of claim 1, wherein at least one of the selecting steps includes the step of:

interacting with a particular HCP in the selection of HCPs, through the user interface, to select the HCP.

4. The method of claim 3, wherein the displaying step is preceded by the steps of executing a search of the database in which the search criteria includes a search for the expense date being included in a database entry for any of the selection of HCPs.

5. The method of claim 3, wherein the displayed selection of HCPs is presented on the display in association with a scroll control, the method including the additional step of selectively scrolling the set of HCPs to display the particular HCP prior to the interacting step.

6. The method of claim 3, wherein the displayed selection of HCPs is displayed in a customers-seen region on the display, the method including the additional step of displaying each HCP having an allocated expense amount of the line-item entry in a expense-applicable region on the display which is different than the customers-seen region.

7. A computer-assisted method for electronically assigning an expense of a particular representative among a plurality of representatives with one or more health care providers ("HCPs"), each HCP being identified within a database, comprising the steps of:

providing expense report data to a memory of a machine, the expense report data including a line-item entry having an associated expense amount and an expense date;

presenting the line-item entry on a display of the machine;

displaying a selection of HCPs that satisfy a criterion of identified in the database and having a call-note entry in the database which corresponds to a visit by the particular representative with the HCP on the expense date;

selecting through interaction with a user interface on the machine a particular HCP among the selection of HCPs that satisfy the criterion;

selectively selecting through further interaction with the user interface another HCP from among the selection of HCPs that satisfy the criterion;

automatically allocating the expense amount of the line-item entry into dollar amounts among each selected HCP using a processor of the machine and in response to the deletion of one or more selected HCPs;

refreshing the display so as to display an HCP to whom an expense was already allocated in an expense-applicable region and to display an HCP to whom an expense was not allocated in a customers-seen region, wherein the expense-applicable region is different than the customers-seen region;

updating database entries to reflect the allocated expense amount using the processor of the machine and to include a year-to date-spending total allocated to each selected HCP, including in the spending total of expenses allocated to each selected HCP by any of the plurality of representatives;

displaying on the display of the machine the year-to-date spending total associated with at least each of the HCPs to which the expense amount of the line-item entry has been allocated; and causing the machine to produce one or more alerts in the event that a prescribed time period has transpired prior to the updating step being performed in regard to the line-item entry in the expense report data.

8. The method of claim 1, wherein at least one of the selecting steps includes the steps of:

executing a search of the database;

presenting a selection of HCPs responsive to the executed search on the display of the machine; and interacting with a particular HCP in the selection of HCPs through the user interface.

9. The method of claim 8, wherein the executed search comprises a database query formulated by the particular representative.

10. The method of claim 8, wherein the set of HCPs is presented on the display in association with a scroll control, the method including the additional step of selectively scrolling the selection of HCPs to display the particular HCP prior to the interacting step.

11. The method of claim 1, wherein the providing step comprises downloading the expense report data.

12. The method of claim 1, including the additional step of uploading updated database entries to another machine.

13. The method of claim 1, wherein the updating step includes the step of totaling the allocated dollar amount with any previously stored dollar amount for each selected HCP.

14. The method of claim 13, including the further step of displaying information in the database relating to one or more HCPs in association with a totaled dollar amount.

15. The method of claim 13, including the additional step of displaying year-to-date information included in the database which relates to any allocated or totaled dollar amount of one or more expense amounts in a present calendar year.

16. The method of claim 1, including the additional steps of prompting the particular representative to identify a location of at least one selected HCP.

17. The method of claim 1, the method including the additional step of causing the machine to produce one or more alerts in the event that a prescribed time period has transpired prior to the updating step being performed in regard to the line-item entry in the expense report data.

18. The method of claim 1, including the additional steps of:
   importing the expense report data from a third-party vendor into a central computer;
   parsing the imported expense report data so as to identify a subset of expense report data associated with the machine or a particular representative assigned to the machine; and
   wherein the providing step comprises downloading the subset of expense report data from the central computer to the machine.

19. A computer-assisted method for electronically associating an expense of a particular representative among a plurality of representatives with one or more health care providers ("HCPs"), each HCP being identified within a database, comprising the steps of:
   providing expense report data to a memory of a machine, the expense report data including a line-item entry having an associated expense amount and an expense date;
   presenting the line-item entry on a display of the machine;
   obtaining through interaction with a user interface on the machine a first selection of a first HCP that satisfies a criterion of having a call-note entry in the database which corresponds to the visit by the particular representative with the HCP on the expense date;
   automatically allocating an entirety of the expense amount of the line-item entry to the first HCP obtained in response to the first selection using a processor of the machine;
   selectively obtaining through further interaction with the user interface on the machine a second selection of a second HCP from among the selection of HCPs that satisfy the criterion;
   automatically allocating the expense amount of the line-item entry among the first and second HCPs in response to the second selection being made using the processor of the machine and in response to the deletion of one or more selected HCPs;
   updating database entries to reflect the allocated expense amount using the processor of the machine and to include a year-to date-spending total allocated to each selected HCP, including in the spending total of expenses allocated to each selected HCP by any of the plurality of representatives;
   displaying on the display of the machine the year-to-date spending total associated with at least each of the HCPs to which the expense amount of the line-item entry has been allocated; and
   causing the machine to produce one or more alerts in the event that a prescribed time period has transpired prior to the updating step being performed in regard to the line-item entry in the expense report data.

20. The method of claim 19, wherein the expense report data includes plural line-item entries, each line-item entry has a respective associated expense amount, and the selections and allocations are made with respect to each of said plural line-item entries.

21. The method of claim 1, wherein a representative of a manufacture or service provider has the machine forwarding data to a location associated with or accessible by a central computer.

22. The method of claim 1, wherein expense information to reconcile is a spending limit for an HCP regulated in a territory where the HCP performs his/her duties.

\* \* \* \* \*

UNITED STATES PATENT AND TRADEMARK OFFICE
CERTIFICATE OF CORRECTION

| | | |
|---|---|---|
| PATENT NO. | : 8,688,465 B2 | Page 1 of 1 |
| APPLICATION NO. | : 11/925491 | |
| DATED | : April 1, 2014 | |
| INVENTOR(S) | : Arora et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1658 days.

Signed and Sealed this
Thirtieth Day of September, 2014

Michelle K. Lee
*Deputy Director of the United States Patent and Trademark Office*